United States Patent [19]

Peterson et al.

[11] Patent Number: 4,880,996
[45] Date of Patent: Nov. 14, 1989

[54] OPTICAL PARAMETRIC AMPLIFYING VARIABLE SPATIAL FILTER

[75] Inventors: Phillip R. Peterson; Athanasios Gavrielides; David A. Cardimona, all of Albuquerque, N. Mex.

[73] Assignee: The United States of America as represented by the Secretary of the Air Force, Washington, D.C.

[21] Appl. No.: 234,451

[22] Filed: Aug. 19, 1988

[51] Int. Cl.[4] .............................. H03F 7/00
[52] U.S. Cl. ........................ 307/425; 372/21
[58] Field of Search ........................ 307/425; 372/21

[56] References Cited

U.S. PATENT DOCUMENTS

| | | | |
|---|---|---|---|
| 3,417,346 | 12/1968 | Yatsiv | 331/94.5 |
| 3,432,768 | 3/1969 | Garwin | 331/94.5 |
| 3,629,602 | 5/1970 | Firester | 307/425 |
| 3,771,065 | 11/1973 | Goldberg et al. | 331/94.5 L |
| 4,048,516 | 9/1977 | Ammann | 307/88.3 |
| 4,264,877 | 4/1981 | Grischkowsky et al. | 331/94.5 G |
| 4,294,508 | 10/1981 | Husbands | 350/96.15 |
| 4,315,224 | 2/1982 | Ezekiel et al. | 331/3 |
| 4,318,057 | 3/1982 | Buchwald et al. | 372/70 |

Primary Examiner—William L. Sikes
Assistant Examiner—B. R. R. Holloway
Attorney, Agent, or Firm—William G. Auton; Donald J. Singer

[57] ABSTRACT

An optical parametric amplifier system is used to illuminate an object of interest with a signal beam, and parametrically mix the signal beam from the object with a pump beam to produce a down converted idler beam which maintains an image of the object of interest but which has a frequency which equals the difference between the frequencies of the pump beam and the signal beam. A signal laser is used to illuminate the object of interest; while a pump laser produces the pump beam. A beam combiner mirror produces a combined output by receiving and combining the pump beam and the signal beam. Finally, a nonlinear crystal receives and down converts the combined output of the beam combiner mirror to produce the idler beam by parametrically mixing the signal beam with the pump beam. When a KDP nonlinear crystal is used, the crystal optic axis may be rotated with respect to the direction of propagation of the idler beam to spectally score and amplify the image of the object of interest.

1 Claim, 11 Drawing Sheets

OPTICAL PARAMETRIC AMPLIFYING VARIABLE SPATIAL FILTER

BACKGROUND OF THE INVENTION

The present invention relates generally to diffractive imaging laser systems, and more specifically to an optical parametric amplifier system which is designed to act as an amplifying variable spatial bandpass filter.

Much of the early work in optical parametric processes concerned the upconversion of weak infared signals as well as some of the associated imaging properties. Parametric amplifiers are now commonly used as a means of amplifying optical waves. In these systems a coherent pump wave is made to interact with a nonlinear optical crystal to produce amplifiction at two other optical wavelengths.

More recently, interest has shifted to parametric down conversion with an emphasis on the nonclassical aspects of photon correlations, photon interferences, and the production of squeezed states. A parametric converter is a conventional optical device which converts an input optical signal at one frequency into an output signal at a different frequency. A parameter down-converter is a particular parametric converter in which the output signal has a frequency which is lower than that of the input signal.

The amplifying character of parametric down conversion in combination with the possibilities of low noise detection by squeezed states leads to some interesting imaging applications. However, there have not been any systems for diffractive imaging in parametric processes. The task of providing such a system is alleviated; to some extent, by the systems disclosed in the following U.S. Patents, the disclosures of which are incorporated herein by reference:

U.S. Pat. No. 3,488,106 issued to Lohmann;
U.S. Pat. No. 4,320,358 issued to Peterson et al;
U.S. Pat. No. 3,432,768 issued to Garwin;
U.S. Pat. No. 3,771,065 issued to Goldberg et al.;
U.S. Pat. No. 3,417,346 issued to Yatsiu;
U.S. Pat. No. 4,048,516 issued to Ammann;
U.S. Pat. No. 4,315,224 issued to Ezekiel et al.;
U.S. Pat. No. 4,318,057 issued to Buckwald et al.;
U.S. Pat. No. 4,264,877 issued to Grischkowsky et al.; and
U.S. Pat. No. 4,294,508 issued to Husbands.

The above-cited patents include references that disclose laser systems in which a pump frequency laser is combined with a signal frequency laser to create another beam. Yatsiv is concerned with a laser having Raman material for double quantum absorption and Buchwald et al. speak of a Raman laser which uses two optical pumping mechanisms. Ezekiel et al. use three pumping lasers on a molecular beam, but the second and third pumps are not at a point further down the beam from the first optical pumping source. Also, in the Ezekiel et al. reference, construction of two of the optical pumping beams are at the same frequency. Stimulated Raman Scattering (SRS) is disclosed in the Amann patent.

Grischkowsky et al. disclose a laser which may employ the Stimulated Raman Scattering (SRS) process. The patent shows embodiments with various plural pumping arrangements and discusses both a two photon process and a three photon process. The Husbands reference discloses an optical multiplexer which combines a plurality of laser beams. The Lohman patent discloses a spatial filtering system for performing differentiation.

While the above-cited references are instructive, there remains a need for frequency down-converting spatial band pass filters. The present invention is intended to satisfy that need.

SUMMARY OF THE INVENTION

The present invention includes an optical parametric amplifying variable spatial filter for diffractive imaging in laser systems. In one embodiment of the invention, a monolinear crystal is used to parametrically mix a signal laser and a pump laser to create another beam called an idler. The idler beam has a frequency which has a value which equals the difference between the frequencies of the pump laser and the signal laser, and maintains an image of the object transferred to it. As the crystal optic axis is rotated, the transferred scene changes in that it spectrally scores and amplifies the original object.

It is an object of the present invention to provide a continuously variable nonlinear spatial bandpass filter.

It is another object of the invention to provide an amplifying spatial band pass filter capable of amplifying a narrow band of spatial frequencies.

It is another object of the present invention to provide a frequency down-converting spatial bandpass filter.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes an optical parametric amplifying variable spatial filter system in which an optical parametric amplifier is designed to act as an amplifying variable spatial bandpass filter.

Figure 1:
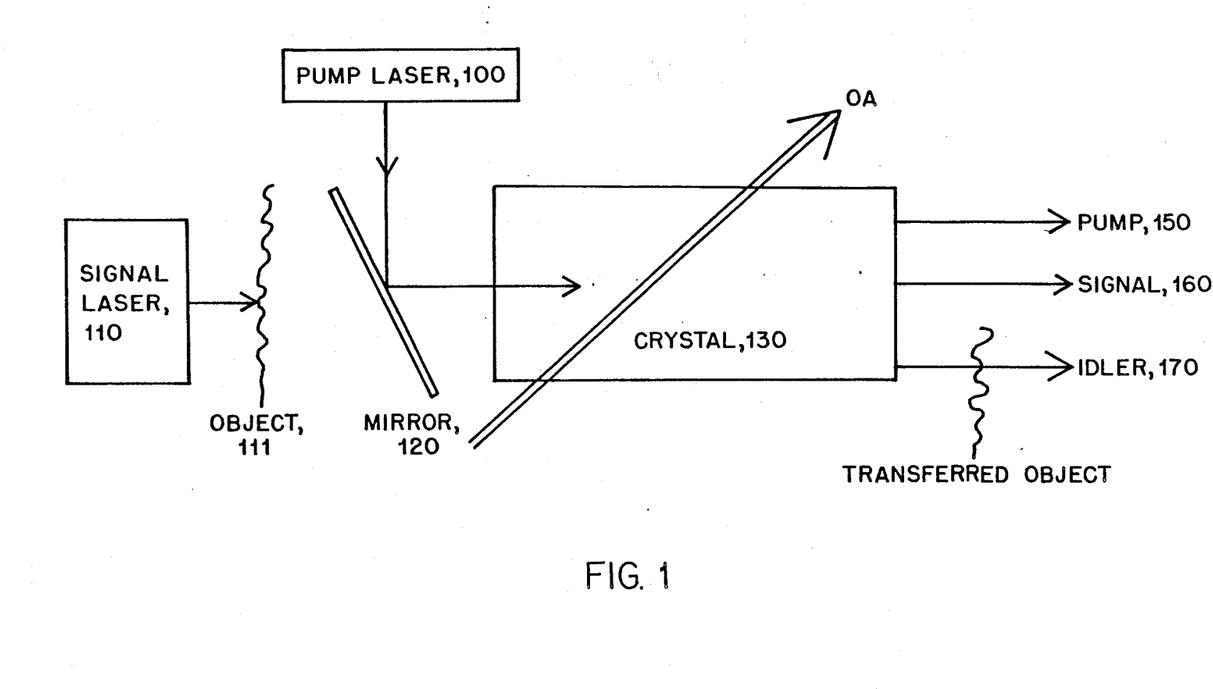
FIG. 1 is a schematic of the present invention.

The reader's attention is now directed towards FIG. 1, which is a schematic of an embodiment of the present invention. The system of FIG. 1 includes a pump laser 100, a signal laser 110, a beam combining mirror 120, and a nonlinear crystal 130.

The pump laser 100 is a commercially-available system which produces the pump beam 150 at frequency $\omega_p$. The signal laser 110 is also a commercially-available laser which illuminates an object 111 with a signal beam 160 at frequency $\omega_s$. The object 111 being illuminated can be any object of interest such as a bar chart. The beam combining mirror receives and combines the pump beam 150 from the pump laser 100 and the signal beam 160 from the object of interest 111 to output a combined beam to the nonlinear crystal 130. The nonlinear crystal 130 is also a commercially available optical element such as a potassium dihydrogen phosphate (KDP) crystal with a well-defined optic axis (OA) For an example of the use of such devices in Stimulated Raman Scattering devices see the U.S. patent application Ser. No. 144,310 entitled "Stimulated Raman Scattering Enhancer" by David A. Cardimona, filed on 14 Jan. 1988, the disclosure of which is incorporated herein by reference.

The pump and signal (after illuminating the object) mix parametrically in the crystal to create another beam called the idler at a frequency $\omega_i \omega_p - \omega_s$, which has an image of the object transferred to it. As the crystal optic axis is rotated the transferred scene changes in that it spectrally scans and amplifies the original object. The rotation of the optic axis of the crystal with respect to the direction of propagation of the idler beam impacts the transfer function in the manner described below.

In one embodiment of the invention, the signal laser 110 is a commercially-available laser which produces a signal beam 160 with a wavelength $\lambda_s = 1.0 \times 10^{-4}$ cm. The pump laser 100 produces the pump beam 150 with a wavelength $\lambda p = 353 \times 10^{-7}$ cm. The mathematics of the parametric down conversion are discussed in detail below. In this example the KDP nonlinear crystal 130 will parametrically mix the pump beam and signal beam to produce the idler beam with a wavelength $\lambda_i = 545.59 \times 10^{-7}$ cm.

The KDP crystal of FIG. 1 has a crystal length of about 5.0 cm, and an optical gain of about 1.0/cm. As mentioned above, when the optical axis is rotated with respect to the direction of propagation of the idler beam, it impacts the transfer function which adjusts both the amplitude of the idler beam, as well as the cutoff frequency. As discussed below, the KDP crystal acts as a tuneable spatial bandpass filter with a direction of propagation determined by the paraxial phase match condition. Specific examples of the transfer function are illustrated in the figures at various values of $\theta_c$ where $\theta_c$ is the angle between the optical axis of the KDP crystal, and the direction of propagation of the idler beam. For example, in FIGS. 4 and 5, $\theta_c$ equals seventy degrees. In FIGS. 8-11 $\theta_c$ equals 64.52 degrees. Note that the amplitude of the idler beam is also proportional to the plane wave pump amplitude. This gives the user two ways to adjust th idler beam: rotating the KDP crystal, and adjusting the amplitude of the pump beam.

In the present invention, a nonlinear KDP crystal is used for down conversion. In one embodiment of the invention, the nonlinear crystal has a crystal length of 5.0 cm and is mounted such that its optical axis may be rotated with respect to the direction of propagation of the idler beam. A general description of the relationship of this angular rotation rotation and the wavelength dependence with changes in the transfer function may be found in Chapter 17 of a text by A. Yariv entitled "Quantum Electronics" published by Wiley in New York in 1975, and in an article by F. Zernike published in the Journal of the Opt. Soc. of Am. on 54,125 in 1964 entitled "Refractive Indices of Ammonium Dihydrogen Phosphate and Potassium Dihydrogen Phosphate between 2000 Å and 1.5μ", the disclosures of which are incorporated herein by reference.

The above-cited Yariv text also discusses the use of a non-linear KDP crystal in frequency conversion as a parametric oscillator, and gives examples of the rise of non-linear crystals in parametric amplifier systems in Chapter 22. Yariv observes that that the crystal orientation can serve as a means of tuning the oscillation frequencies of a parametric oscillator.

Returning to FIG. 1, all of the individual elements of the invention are commercially-available and need not be described in detail. Note that when the invention is used for down conversion, the frequency of the pump laser should be greater than the frequency of the signal laser. While a detailed analysis follows for the use of an example, other lasers can be used as long as the pump laser has a frequency which is measurably greater than that of the signal laser. For example Spectra Physics makes a variety of lasers suitable for use. Similarly, both the beam combiner mirror 120 and the non-linear crystal 130 are commercially-available optical elements. A variety of trunnion mounts may be used to hold the crystal 130 so that its optical axis may be varied with respect to the direction of propagation of the idler beam. These mounts are believed to be known in the art, and need not be described in detail. An example of a micromaniputator servomechanism is provided in U.S. Pat. No. 4819496 entitled "Six Degrees of Freedom Micromanipulator" by Gad Shelef, which was filed at the U.S. Patent and Trademark Office on Nov. 17 1987. This Schelef reference discloses an adjustable micromanipulator which could be used to hold the KDP crystal 130 of FIG. 1. For this reason, the Schelef reference is specifically incorporated herein by reference.

The discussion that follows in intended to present the solutions to the coupled signal and idler paraxial equations for undepleted plane wave-pump upconversion and down conversion. With these approximations the differential equations are linear and can be solved with Fourier transforms. This procedure gives the complex transfer functions in terms of spatial frequency, propagation vectors, gain, and crystal length. Additionally, the phase match condition is derived to show its importance in determining the phase match condition is derived to show its importance in determining the phase and amplitude of the transfer functions. Finally we investigate some of the imaging properties by deriving the signal to idler imaging equation. This information would allow one skilled in the art to practice the system of FIG. 1 using commercially-available equipment.

The theory behind the present invention is initiated by stating the diffraction equations for all fields propagating in the z-direction. The subscripts p, s, and i denote the pump, signal and idler respectively. With this nomenclature the coupled differential equations for down conversions are:

$$\left(\nabla_t^2 - 2ik_s \frac{\partial}{\partial z}\right) U_s(\vec{r},z) = \tag{1a}$$

$$-k_s g U_i^*(\vec{r},z) \exp(-i\Delta k z) - 2ik_s U_s(\vec{r},0) \delta(z),$$

$$\left(\nabla_t^2 + 2ik_i \frac{\partial}{\partial z}\right) U_i^*(\vec{r},z) = \tag{1b}$$

-continued
$$-k_i g U_s(\vec{r},z)\exp(+i\Delta kz) + 2ik_i U_i^*(\vec{r},0)\delta(z),$$

where the last terms express the discontinuity of the deriviatives across the $z=0$ boundary through the Dirac delta function $\delta(z)$. The phase mismatch $\Delta k=k_p-k_s-k_i$ and the gain is given by g in cm$^{-1}$ and is proportional to the plane wave pump amplitude.

The solutions to Eqs (1a,b) are easily obtained by using Fourier transforms with the result that $$U_s(\vec{r},z) = \frac{1}{(2\pi)^2} \int d^2p \, A_s(p,0)\exp(izp^2/2K_s)\exp(i\vec{p}\cdot\vec{r}) \, S(\vec{p},z), \quad (2a)$$

$$U_i^*(\vec{r},z) = \frac{i}{(2\pi)^2} \int d^2p A_s(p,0)\exp(-izp^2/2k_i)\exp(i\vec{p},\vec{r}) \, I(\vec{p},z), \quad (2b)$$

where the signal and idler transfer functions are given by $$S(\vec{p},z) = \left\{ \cosh(\sqrt{g^2-(ap^2+\Delta k)^2} \; z/2) + \right. \quad (3a)$$

$$\left. i(\alpha p^2+\Delta k)z/2 \frac{\sinh(\sqrt{g^2-(ap^2+\Delta k)^2} \; z/2)}{(\sqrt{g^2-(ap)^2+\Delta k} \; z/2)} \right\}$$

$$\exp(-i(\alpha p^2+\Delta k)z/2,$$

$$I(p,z) = \frac{gz}{2} \frac{\sinh(\sqrt{g^2-(\alpha p^2+\Delta k)^2} \; z/2)}{(\sqrt{g^2-(\alpha p^2+\Delta k)^2} \; z/2)} \quad (3b)$$

Here $A_s(p,0)$ is the Fourier integral of the input signal field $U_s(r,0)$, $$A_s(\vec{p},0) = \int d^2r U_s(\vec{r},0)\exp(-i\vec{p}\cdot\vec{r}), \quad (4)$$

and for simplicity we have set $U_i(\vec{r},0)=0$. The constant $\alpha$ equals the average $(1/K_s)+1/k_i/2$. Before proceeding we mention that Eqs (2,3) reduce to the usual solutions when the input is a plane wave, that is when $A_s(\vec{p},0)=(2\pi)^2\delta(\vec{p})$. Furthermore, if $g=0$ the idler solution vanishes and the signal reduces merely to free space propagation. Finally, if absorption is included the above Fourier techniques are still applicable. In fact, if both the signal and idler have the same absorption coefficient, then the solution to the absorption problem is Eq. (2) damped by the usual exponential. However, if they have different absorptions then there is a small induced phase.

Before presenting numerical examples of $S(\vec{r},z)$ and $I(\vec{r},z)$ we will briefly consider the general behavior of the idler transfer function. First note that the phase is always $(ap^2+\Delta k)z/2$ and is independent of the gain. Second for $$\Delta k \leq 0, \; \sinh(\sqrt{g^2-x^2} \; z/2)/(\sqrt{g^2-x^2} \; z/2)$$

is a monotonic function and has a maximum value of $\sinh(zg/2)$ when $x=(\alpha p^2+\Delta k)=0$. Third for $\Delta k$ positive there are two cases depending on g. If $g>\Delta k$ the sinh is a maximum and equals $\sinh(zg/2)$ when x is a minimum. However, for $g<\Delta k$ the transfer function is always a sinc function with a maximum $(g/\Delta k)\sin(z\Delta k/2)$ for $x=a$ minimum. Furthermore, there is appreciable gain only for $$\sqrt{\Delta k^2 - g^2} \ll (2\pi/z).$$

In terms of spatial frequency, the idler transfer function maximizes at $$P_m = \sqrt{-\Delta k/\alpha} \;\; \text{for} \; \Delta k \geq 0 \quad (5a)$$

$$P_m = 0 \; \text{for} \; \Delta k > 0 \quad (5b)$$

which is independent of z and g. Thus there is always a spatial frequency which gives the same amplification as in the phase-matched case. The condition $ap_m^2+\Delta k=0$ is just the paraxial approximation to the phase match condition:

$$k_s\sqrt{1-p_s^2/k_s^2} + k_i\sqrt{1-p^2/k_1^2} - k_p = 0,$$

where $$p = k_s\sin\Phi_s = k_i\sin\Phi_i$$

and is the Fourier transverse coordinate consistent with the plane wave decomposition in eq. (4).

Here $\Phi_s$, $\Phi_i$ are the angles that the signal and idler propagation vectors make with the z axis (the $k_p$ direction). Finally the exponential character changes to sinusoidal when $$g^2 - (\alpha p_o^2 + \Delta k)^2 = 0 \; \text{or} \; p_o = \sqrt{(g-\Delta k)/\alpha} \;,$$

independent of z. Thus $I(\vec{p},z)$ exhibits a cutoff when $$\sqrt{g^2-(p_c^2+\Delta k)^2} \; z/2 = i\pi \; \text{or} \quad (6)$$

$$P_c = \{[((2\pi/z)^2+g)^{1/2} - \Delta k]/\alpha\}^{1/2}$$

which depends on all the parameters. Finally, these equations lead to an estimate of the spatial bandwidth $\Delta p$ as:

$$\Delta p = 2(p_c - p_m) \quad (7a)$$

$$= \frac{p_c^2 - p_m^2}{p_m} = \sqrt{\frac{(2\pi/z)/z)^2+g^2}{-\alpha\Delta k}} \quad \begin{array}{l}\Delta k < 0 \\ p_m = p_c\end{array} \quad (7b)$$

centered about $p_m$.

The shape of the signal transfer function is somewhat similar to the idler but quantitatively less restrictive, because of the $\sin(x)/x$ behavior the idler amplitude has a cutoff. However, the same is not true of the signal because, for example, the amplitude for large $(\alpha p^2+\Delta k)$ approaches unity. Thus frequencies near $(\alpha p^2+\Delta k)=0$ are amplified while those away from the value are passed without alteration.

Finally a few words about the role of the gain. For $\Delta k\geq 0$, the value of $p_m$ where the transfer function is maximum, is independent of the gain. If g decreases then the width Δp also decreases, however it is not a strong function of g unless it is a high gain situation with $g > (2\pi/z)$, Δk. If $\Delta k \geq 0$ the maximum value of the transfer function is sinh $g^2 - \Delta k^2$ z/2 which occurs at $p_m = 0$ and only in the high gain region is the g dependence significant.

We will now illustrate some of these features by considering down conversion of $\lambda_s \doteq 1.0 \times 10^{14}$ cm to $\lambda_1 = 545.59 \times 10^{17}$ cm with $\lambda_p = 353 \times 10^{-7}$ cm in KD*P. Additionally, the crystal length is picked to equal 5.0 cm and the gain gain to equal 1.0/cm. These values are chosen so that the cutoff frequency $p_c$ is not dominated by either z or g. The remaining step is to characterize ΔK and α as function of $\theta_c$, where $\theta_c$ is the angle between the crystal axis and the direction of propagation. Table 1 displays this relationship and has been generated by using the $\theta_c$ dependence and the wavelength dependence of the indices of refraction and by requiring that the pump and signal be extraordinary rays and the edler by an ordinary ray. In this region α equal $8.29 \times 10^{-6}$ cm and is nearly constant.

TABLE I

| Phase Mismatch as a Function of $\theta_c$ | |
| --- | --- |
| $\theta_c$ (degrees) | Δk(cm$^{-i}$) |
| 60.97550 | $1.562 \times 10^{-2}$ |
| 61.0 | −2.055 |
| 61.1 | −10.523 |
| 64.52 | −287.617 |
| 70.0 | −674.531 |

Figure 2:
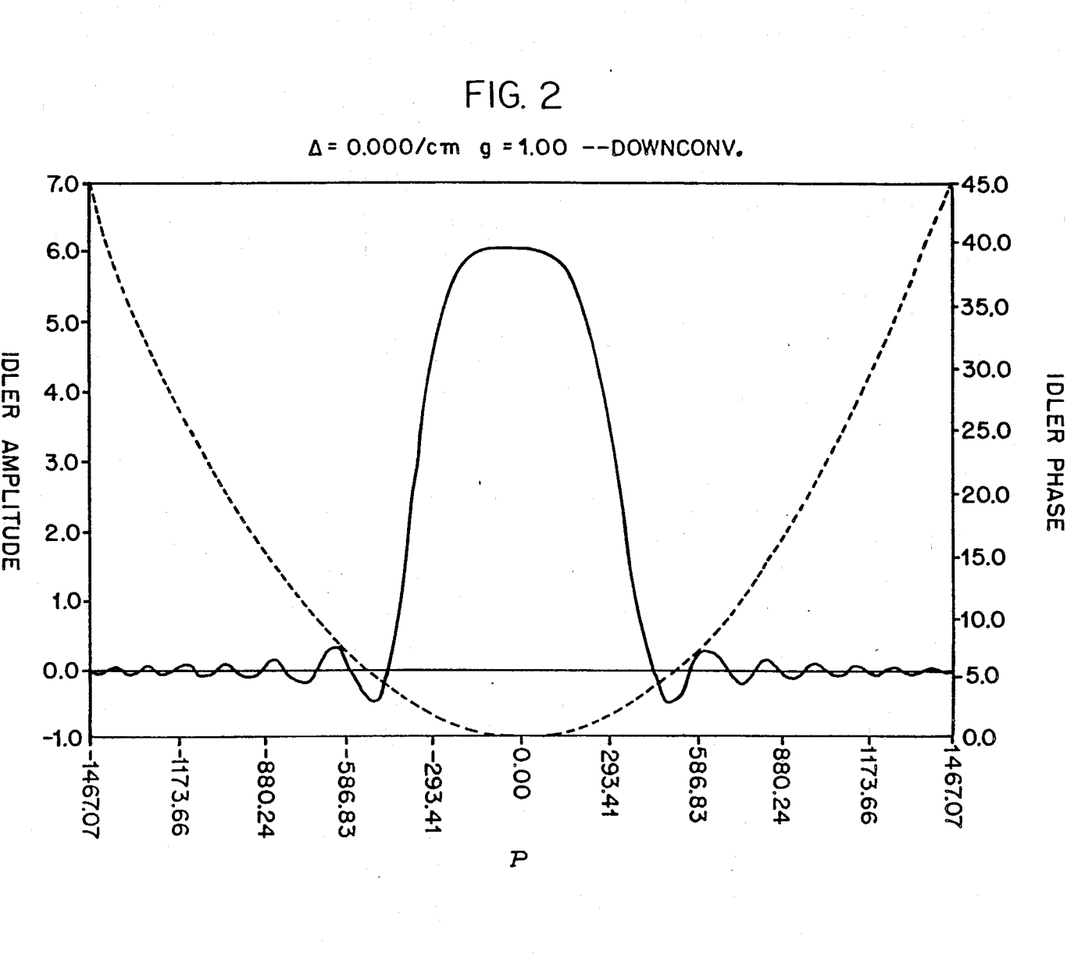
FIGS. 2 and 3 are charts depicting down conversion idler and signal transfer functions as a function of p (radians/cm) at phase match.
Figure 3:
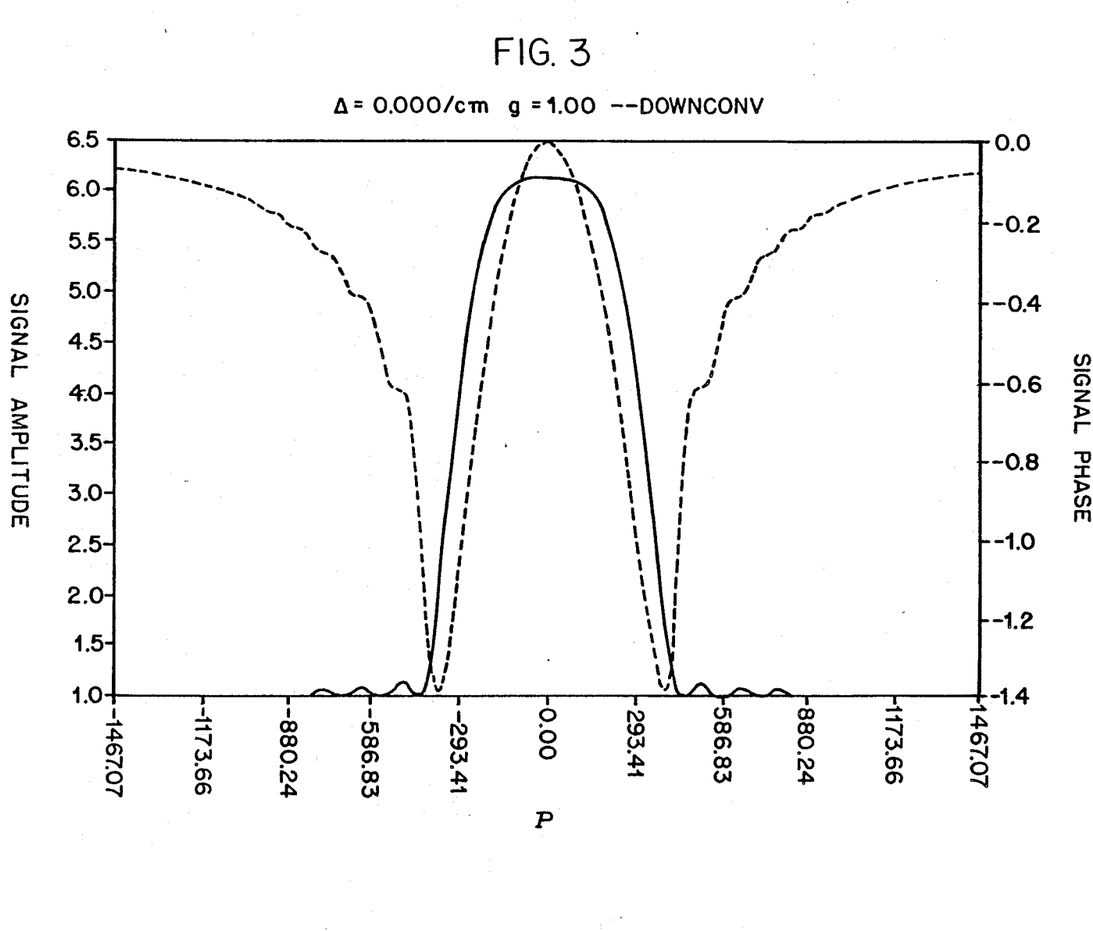

The readers attention is now directed towards FIGS. 2-5. FIGS. 2 and 3 are charts depeicting down conversion down conversion idler and signal transfer functions as a function of $_p$(radians/cm) at phase match. In all figures, the solid curve depicts the amplitude and the dashed curve depicts the phase.

The following discussion and sequence of figures show the transfer functions as the crystal axis is rotated to larger angles making Δk a larger negative number. At phase match Δk=0, see FIGS. 2 and 3, the idler transfer amplitudebehaves like a cylinder function with height sinh(gz/2) and has a cutoff in the neighborhood of $p_c$=500 radians/cm. This indicates that the idler f-number (f) is limited approximately to f=1 (2λ500/2π). The signal amplitude acts like 1+α cylinder function with height cosh(gz/2), and so it passes all frequencies. The phase obtained from Eq (3) are $$\psi_s = -\psi_i + \tan^{-1}\left\{ \frac{(\alpha p^2 + \Delta k)\tanh(\sqrt{g^2 - (\alpha p^2 + \Delta k)}\ z/2}{\sqrt{g^2 - (\alpha p^2 + \Delta k)}} \right. \quad (8b)$$

for the idler and signal resepctively. These show that the idler transfer function phase is quadratic in spatial frequency indicating a focusing effect. However, the signal transfer function is modulated by the more complicated phase shown in the figures. It is defocused in the the region of amplified spatial frequency and shows a divergence in the outer portions of the spectrum until finally approaching a constant where the signal transfer funcion amplitude approaches unity.

Figure 4:
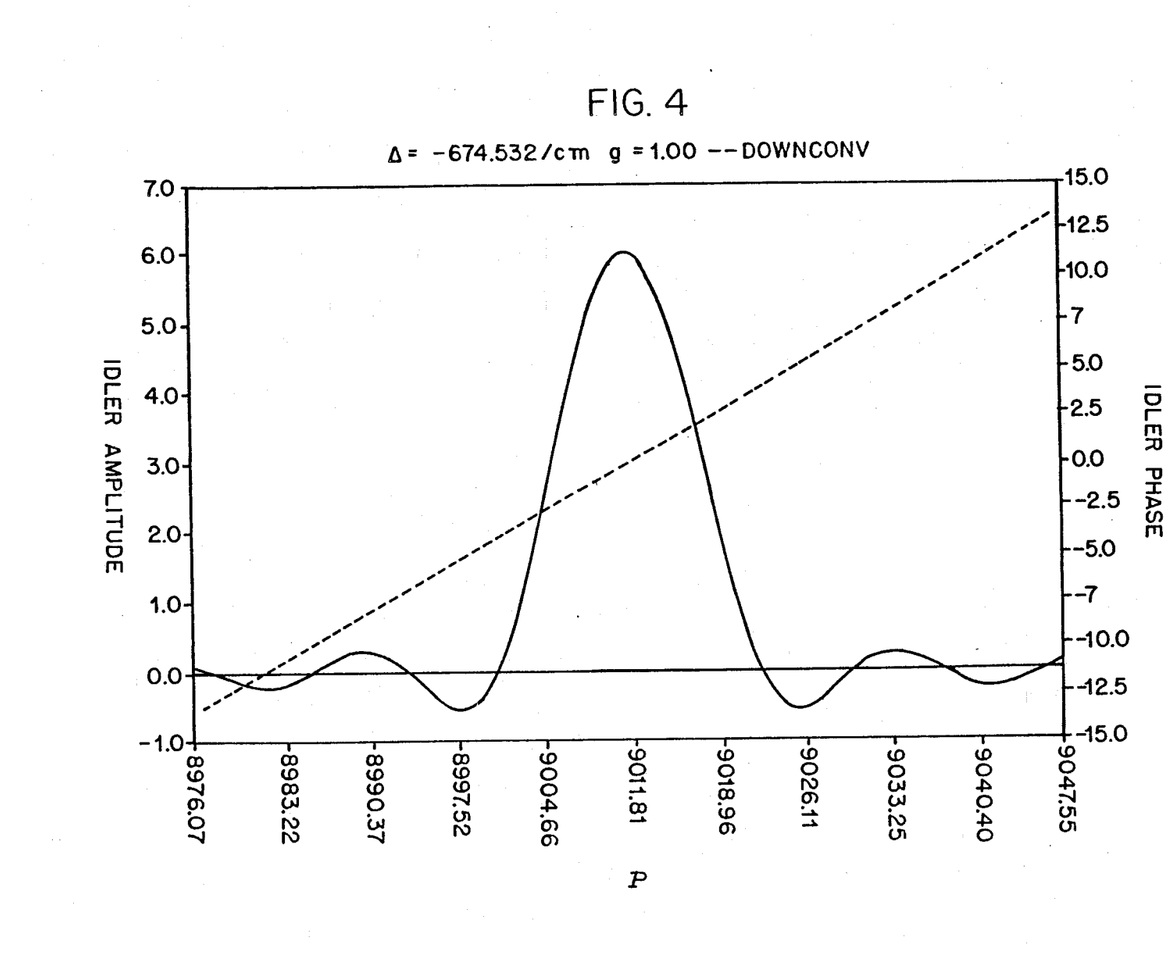
FIGS. 4 and 5 are charts depicting down conversion idler and signal transfer functions as a function of p (radians/cm) for $\Delta k = 674-617$ cm.
Figure 5:
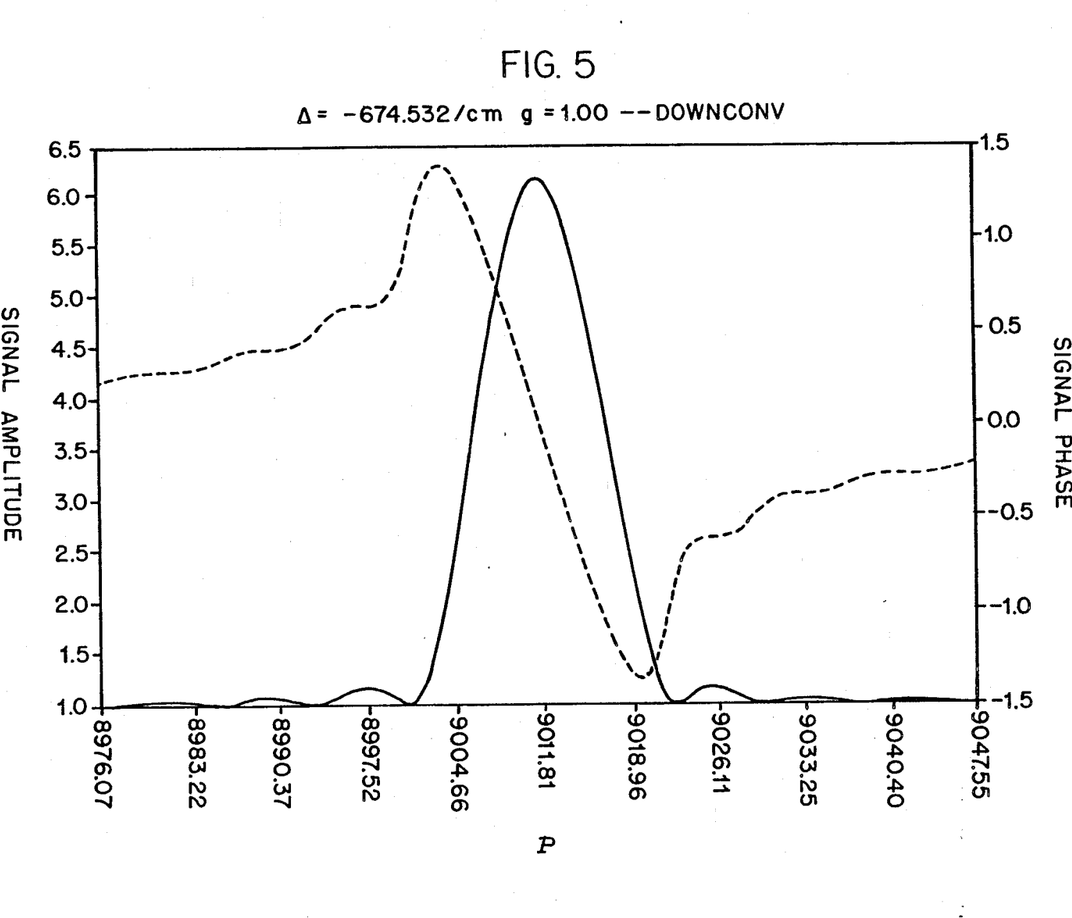

FIGS. 4 and 5 display the transfer dunctions for θ=70° and explicity shows that there is a p value, given by the paraxial phase match condition for which the transfer functions have the same maximum gain as for the Δk=0 case. The main difference between FIGS. 4 and 2 is that the entire spectrum in FIG. 2 has been moved out to larger spatial frequencies and the widths have narrowed considerably. Thus the idler amplitude is acting like a tuneable spatial bandpass filter with a direction of propagation determined by the paraxial phase match condition. The signal however, is entirely passed with its spectrum around the paraxial phase match condition amplified. The phase across this region is again approximately linear but is, in part, determined by the gain [see Eq. (4b)]. Outside the amplified portion the phase approaches zero.

Figure 6:
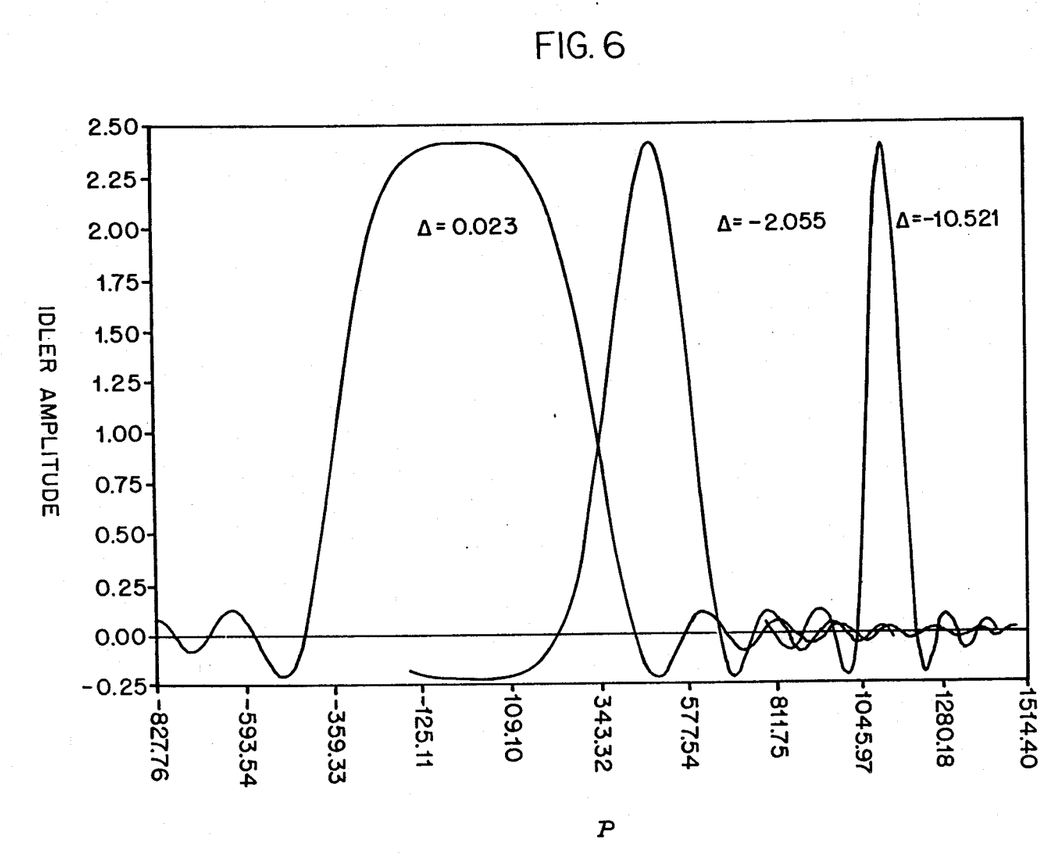
FIGS. 6 and 7 are charts depicting down conversion idler and signal transfer amplitudes as a function of p (radians/cm) for various phase mismatches where $\Delta k$ has units of cm$^{-1}$.
Figure 7:
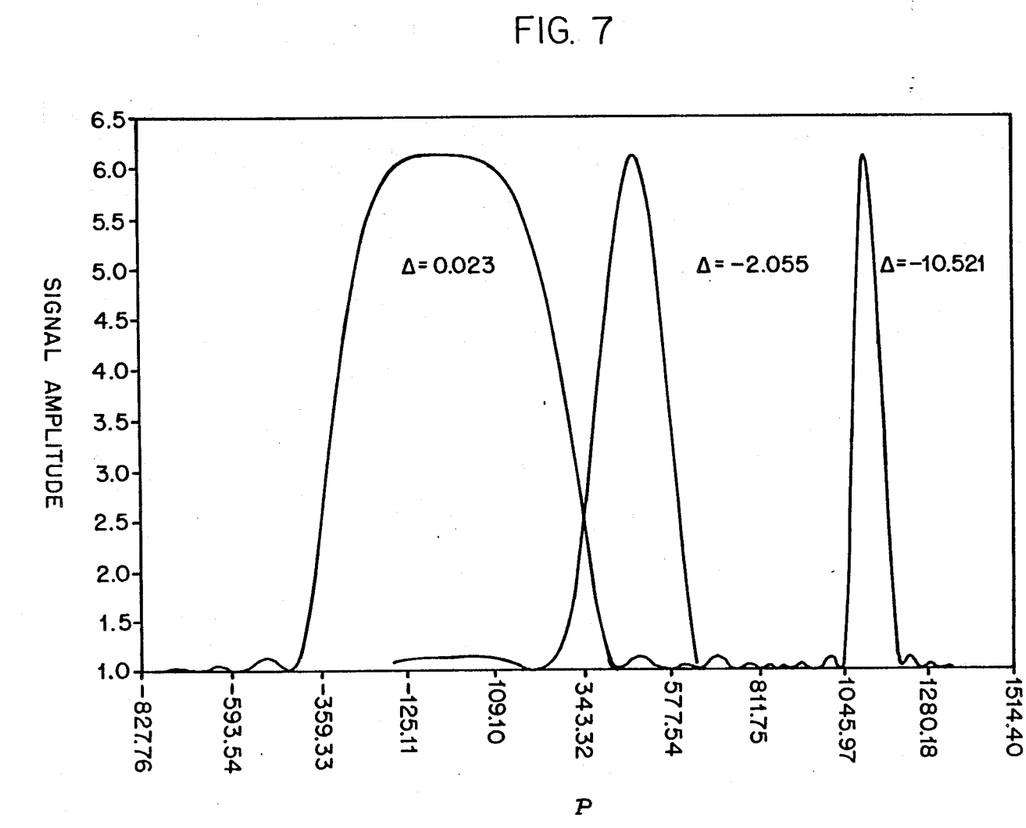

In summary, the signal is transmitted without much disturbance while the idler transfer function can impose a narrow bandpass on the input spectrum. In order to further illustrate this effect we have included FIGS. 6 and 7. This shows the shifting and narrowing idler bandpass as a function of Δk, and the rather constant signal transfer function.

The upconversion differential equations are very similar to those for down conversion, so we immediately write the solutions:

$$\vec{U_s}(\vec{r},z) = \quad (9a)$$

$$\frac{1}{(2\pi)^2} \int d^2\vec{p} A_s(p,0)\exp(izp^2/2K_s)\exp(i\vec{p} \cdot \vec{r}) S(\vec{p},z),$$

$$\vec{U_i}(\vec{r},z) = \frac{-i}{(2\pi)^2} \int d^2\vec{p} A\ (\vec{p},0)\exp(i\vec{z p^2}/2k_i)\exp(i\vec{p} \cdot \vec{r}) I(\vec{p},z), \quad (9b)$$

where the unconversional signal and idler transfer functions are $$\vec{S}(p,z) = \left\{ \cos(\sqrt{g^2 + (\beta p^2 + k)^2}\ z/2) + \right. \quad (10a)$$

$$\left. i(\beta p^2 + k)z/2 \frac{\sin(\sqrt{g^2 + (\beta p^2 + \delta k)^2}\ z/2)}{(\sqrt{g^2 + (\beta p^2 + \delta k)}\ z/2} \right\}$$

$$I(p,z) = \quad \exp(-i(\beta p^2 + \delta k)z/2, \quad (10b)$$

$$\frac{gz}{2} \frac{\sin(\sqrt{g^2 + (\beta p^2 + \delta k)}\ z/2)}{(\sqrt{g^2 + (\beta p^2 + \delta k)^2}\ z/2} \exp(i\beta p^2 + k)z/2).$$

Again $A_s(p,0)$ us the Fourier integral of the input signal field. The down conversion α and Δk have been replaced by their upconversion counterparts $\beta = (1/k_s - 1/k_i)/2$ and $\delta k = k_p - k_s + k_i$, respectively.

Equation (9b) shows that the upconversion idler maximum amplitude is sin (gz/2), typical of the plane wave solution. If $\delta k \geq 0$ the idler maximum amplitude is $$g\sin(\sqrt{g^2\ k^2}\ z/2)/(\sqrt{g^2 + \delta k^2}) \text{ at } p = 0.$$

This has the two limits sin (gz/2) for g>>δk, and (g/δk) sin (z k/2) for g<<δk. However, if k≦0 the maximum amplitude occurs when $\beta p^2 + \delta k = 0$ with the corresponding amplitude sin (gz/2). Thus, regardless of δk, and for a specific $\vec{p}$, the amplitude is bounded by sin (gz/2) and equals unity for gz/2=π/2. For $\delta k \geq 0$, the spectrum is a sin function centered at p=0 and for δk<0 it is a displaced sinc function centered at $\beta p^2 + \delta k = 0$, again the paraxial approximation to the upconversion phase match condition.

The widths and cutoff frequencies can be determined by substituting $g^2 \gg -g^2$, $\alpha \gg \beta \Delta$ and $\Delta k \gg \delta k$ into Eqs (6) and (7) similar to the down conversion, for $k \gg 0$ we require $$\sqrt{g^2 + \delta k^2} \, z/2 < \pi,$$

otherwise the maximum amplitude occurs on one of the side lobes and the amplification is drastically reduced.

Our upconversion examples is essentially the reverse of the down conversion one. That is, we consider the upconversion of $\lambda_s = 1.0 \times 10 \times 10^{-4}$ cm to $_i = 353 \times 10^{-7}$ cm with $\lambda_p = 545.59 \times 10^7$ cm in KDP. Here the idler and signal are extraordinary while the pump is ordinary. This choice gives the upconversion $\delta k$ and the down conversion $\Delta k$ the same $\theta_c$ dependence. The crystal lengtth is again 5 cm.

FIGS. 8–11 show the idler transfer function for $\delta k=0$ and $-287.617$/cm with two gains equal to 0.01 and 1.0 cm$^{-1}$. The $\delta k = -287.616$/cm example corresponds to $\theta_c = 64.52°$ and was chosen so that the upconversion idler transfer function maximized at the same $p_m$ value as in the down conversion case where $\Delta k$ equaled $-674.531$/cm shown in FIGS. 4 and 5, upconversion $\beta = 3.54 \times 10^{-6}$ cm and, like $\alpha$, is relatively constant for the range of $\phi_c$,s we have considered. Finally, the gains of 0.01 and 1.0 cm$^{-1}$ are picked to illustrate the filtering aspects of the upconversion idler. We have not included the upconversion signal transfer function since it can be obtained from the idler through the conservation equation $\overline{S(\vec{p},z)S(\vec{p},z)} + \overline{I(\vec{p},z)I(\vec{p},z)} = 1$ with the phase determined from Eq. (10a).

Figure 8:
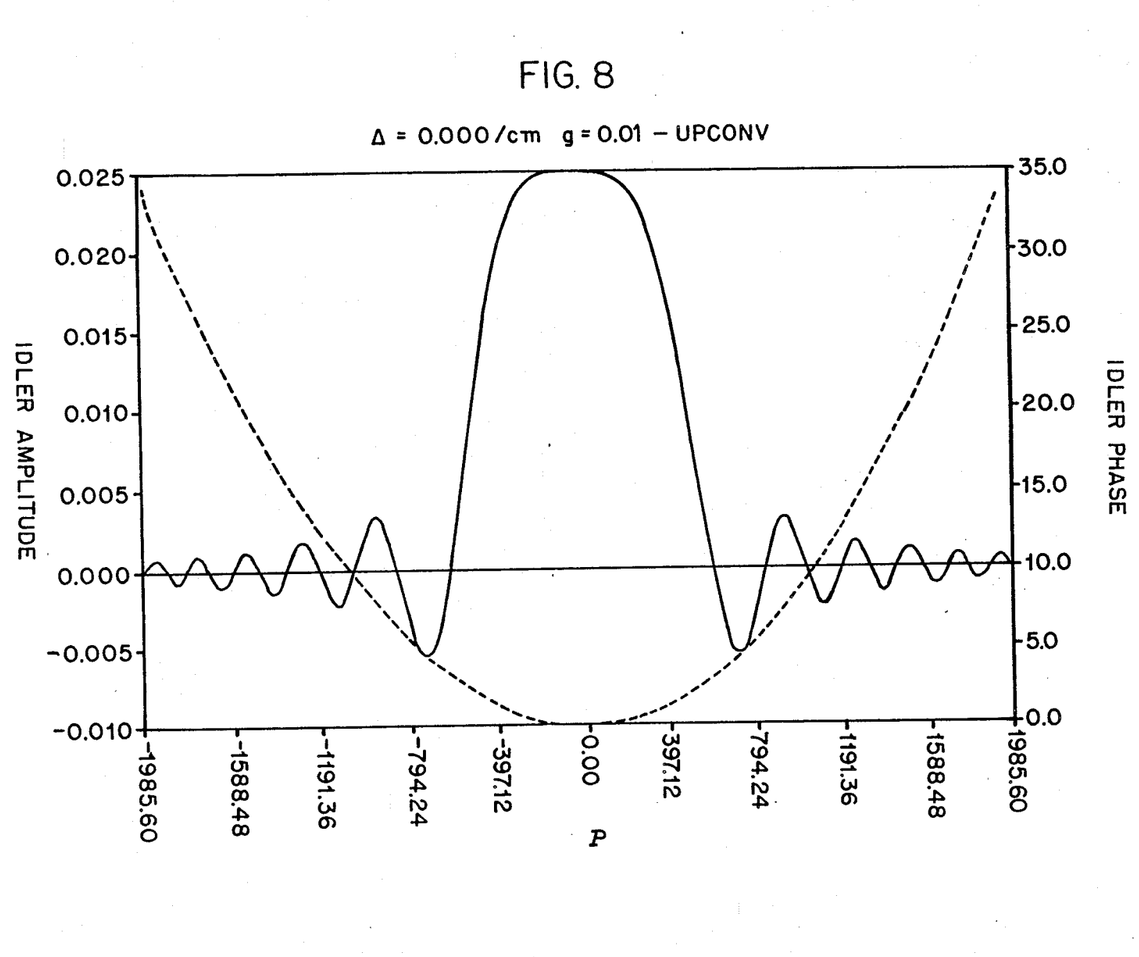
FIGS. 8 and 9 are charts depicting upconversion idler transfer functions as a function of p (radians/cm) at phase match for the gain equal to 0.01, 1.0/cm.
Figure 9:
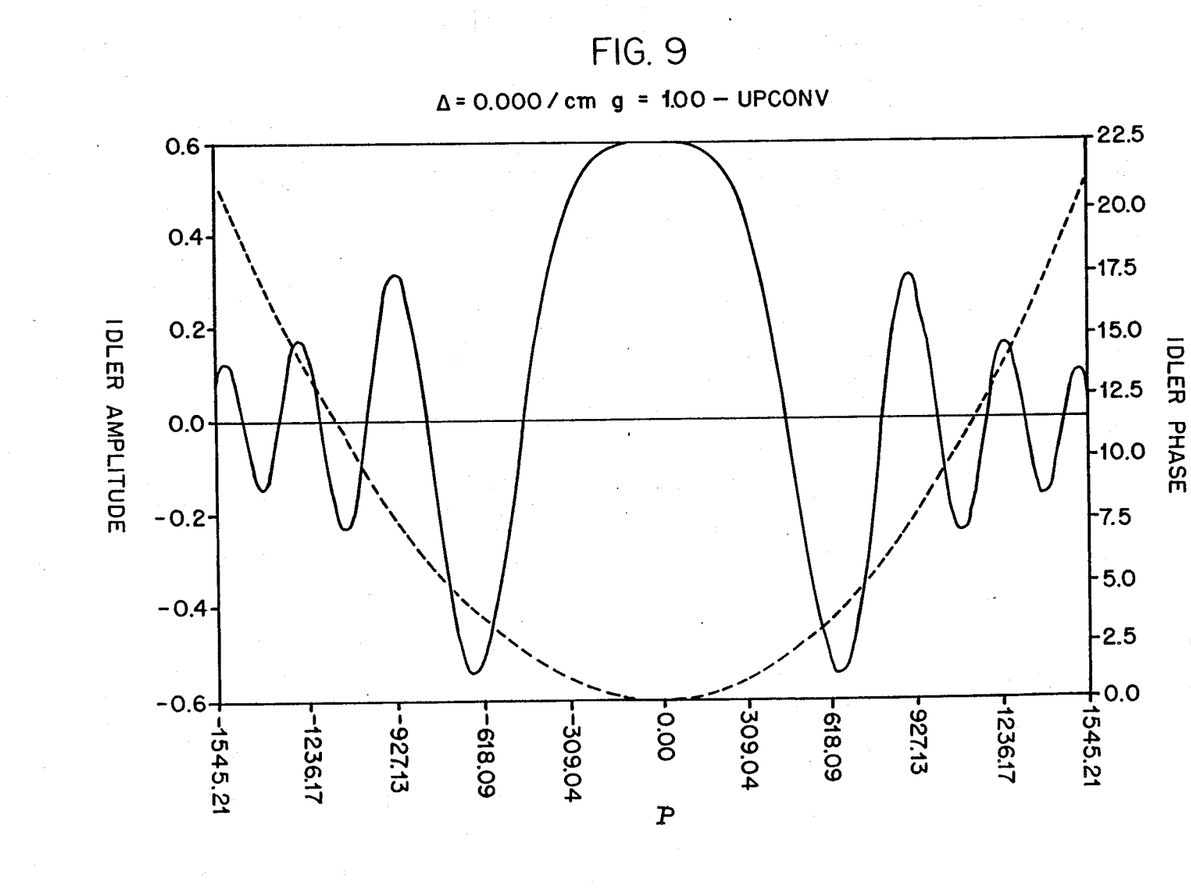
Figure 10:
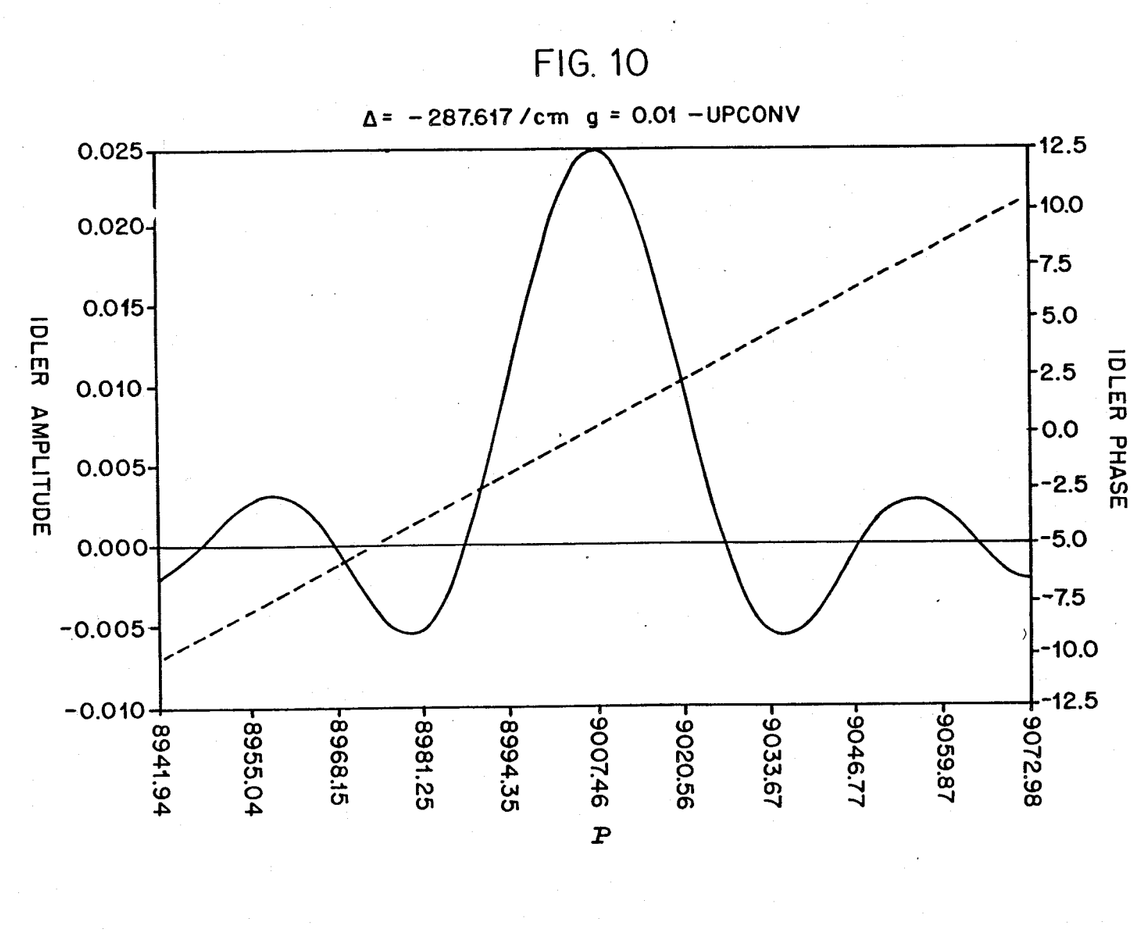
FIGS. 10 and 11 are charts depicting upconversion idler transfer functions as a function of p (radians/cm) for $\Delta k = 287.617$/cm with the gains equal to 0.01, 1.0/cm.
Figure 11:
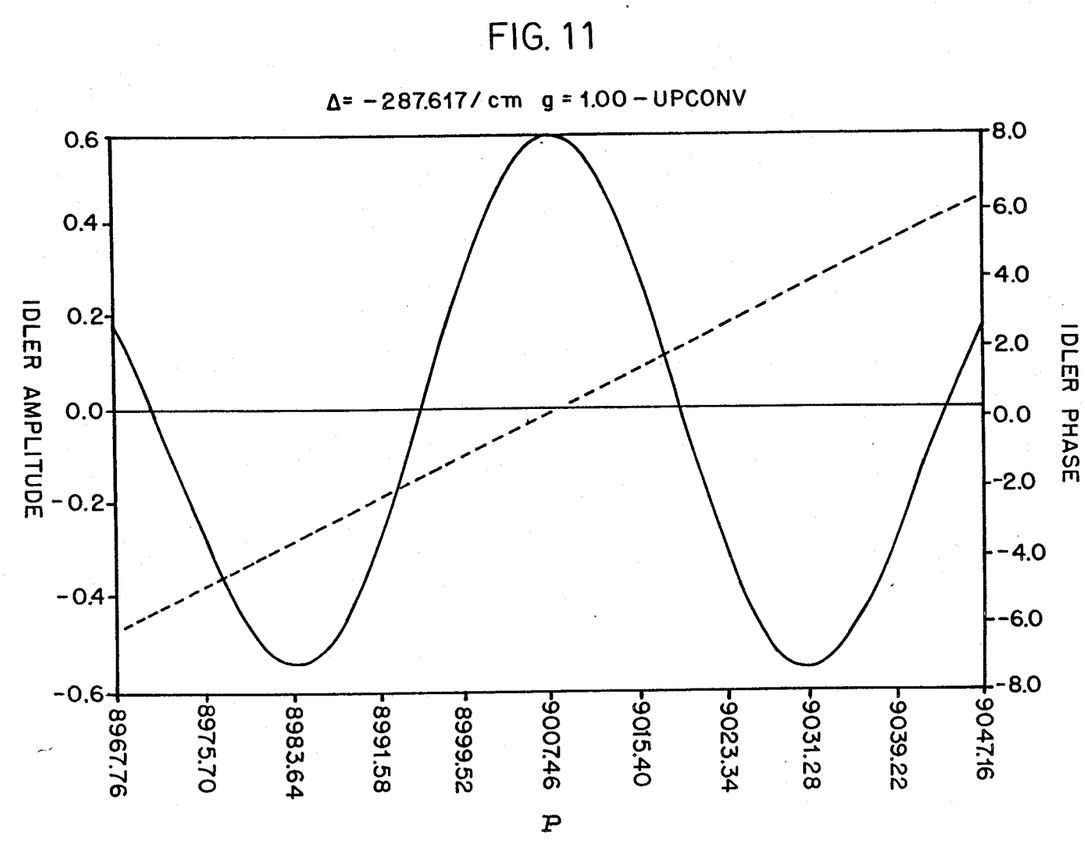

FIGS. 8 and 9 shows $\overline{I(\vec{p},z)}$ at phase match for the gains 0.01 and 1.0 cm$^{-1}$, respectively. Each has maximum value sin $(gz.2)$ centered at $\vec{p}b = 0$ with widths described above. The width for $g=0.01$ cm$^{-1}$ is about 1.3 times larger than the width for $g=1.0$ cm$^{-1}$ which shows the mild dependence on g. The feature which we emphasize is the relative filtering properties at the different gains. The ratio of the central maximum at $p=0$ to the first minimum at $$(\sqrt{g^2 + (\beta p^2 + \delta k)^2} \, z/2) = 3\pi/2 \text{ is } (3\pi/2)\sin(gz/2)$$

which has a maximum value of approximately 4.7. FIGS. 8 and 9 show that the ratios do indeed satisfy this formula and illustrates the smaller the gain the better the filtering properties, however, at the expense of a decrease in the amplification. In other words as the gain is increased, more of the spectrum is passed albeit with many oscillations. This same structure is evident in FIG. (5a, b) where $\delta k = 287.617$ cm$^{-1}$, except that the peaks have shifted and the widths have narrowed. The signal spectrum for $g=0.01$ cm$^{-1}$ is flat for all practical purposes for both $\delta k$'s. However for $g=1.0$ cm$^{-1}$, $\overline{S(\vec{p},z)}$ has a minimum amplitude of 0.80 located at the same frequency as the idler maximum and oscillates in the same fashion.

Equations, (2, 3) specify the down conversion transfer properties for optical parametric amplification and are central to any imaging configuration. Using these we will find under what conditions an object illuminated at the vacuum signal wavelength is imaged at the vacuum idler wavelength. The first step is to free space propagate the object field $U_o(\vec{r},z)$ a distance do to the crystal face. The resulting field is the input signal $U_s$ $(\vec{r},0)$. This field, then, interacts parametrically with the pump in the crystal to produce the idler field $U_i(\vec{r},z)$. The conjugate of Eq. (2b) gives theidler field at the end of the crystal at $z=L$ which is in turn propagated a distance $d_i$ at the idler vacuum wavelength. Performing these various integrations gives the idler field.

$$U_i(\vec{p} \cdot L + d_i) = -i\exp[i(k_i^o d_i - k_s^o d_o - \Delta kL/2)] \quad (11)$$

$$\frac{1}{(2\pi)^2} \int\int d^2\vec{r} d^2\vec{p} \, \vec{p}(\vec{p},L) U_o(\vec{r},d_o)$$

$$\exp[ip^2(\lambda_s^o d_o - \lambda_i^o d_i - 2\pi\beta L)/4\pi]\exp[-i\vec{p} \cdot (\vec{p} - \vec{r})],$$

where $\beta = (1/k_s - 1/k_i)/2$ and is dependent on the indices of refreaction $k^o = \pi/\lambda^o$, and $\lambda^o$ is the vacuum wavelength. The object is described by $U_o(\vec{r},d_o)$ and $P(\vec{p},L)$ is the amplitude of the idler transfer function in Eq (3b) at $z=L$. Thus the idler geometric image is the amplified conjugate of the object with magnification one if $P(\vec{p},L)$ is much broader than the object spectrum $A_s(\vec{p},0)$ and if the signal to idler imaging equation:

$$\lambda_s^o d_o - \lambda_i^o d_i = (\lambda_s - \lambda_i)L/2 \quad (12)$$

is satisfied. Note that the $\lambda$'s withouth the superscript depend on the indices of refreaction. However, if $P(p,L)$ cannot be ignored, and the image equation is still satisfied, the image is the convolution $$U_i(\vec{p},L + d_i) = -i\exp[i(k_i^o d_i - k_s^o d_o - \Delta kL/2)] \quad (13a)$$

$$\int d^2\vec{r} U_o^*(\vec{r},d_o) \vec{P}(\vec{p} - \vec{r},L),$$

where $$\vec{P}(\vec{x},L) = \frac{1}{(2\lambda)^2} \int d^2\vec{p} \, P(\vec{p},L)\exp(i\vec{p} \cdot \vec{x}) \quad (13b)$$

and is the impulse response function $P(2\pi\vec{r}/\lambda_i L, L)$ is the pupil function describing the effective parametric exit aperature. In the other extremee where $P(p,L)$ is so narrow, such as in FIG. 4, that it may be approximated by $\Delta p P(p_m,L)\delta(p-p_m)$, the image becomes $$U_i)pL + d_i) = -i\exp[k_i^o d_i - k_s^o - \Delta kL/2)] \quad (14)$$

$$\Delta p \, P(p_m,L) \, A_o(p_m) \exp(ip_m r)^*$$

where $A_o(p)$ is the Fourier transform of $U_o(r,d_o)$. In this case the image is then the amplified conjugated Fourier component of the object at the spatial frequency $p_m$.

Note that if $d_o$ and $d_i$ had not satisfied the imaging equation, but instead external imaging optics had been used, we would have otained a magnification other than unity. In fact, if a focusing lens is placed at the end of the crystal and if $L < d_o, d_i$, the magnification is the produce of the ratio $\lambda_i/\lambda_s$ times the optical magnification.[2]

A similar calculation may be performed for the upconverted idler field. The transfer function will differ slightly, (Eq.(10b) rather than Eq. (3b), and the imaging equation becomes $$\lambda_s^o d_o + \lambda_i^o d_i = (\lambda_s + \lambda_i)L/2. \quad (15)$$

The preceeding discussion has included solutions for idler coupled equations for an undepleted plane wave pump. With these assumptions the differential equations are linear and amendable to Fourier transform techniques. Inherent in this procedure are the transfer functions which we have found in terms of crystal length, gain propagation vectors, and spatial frequency. Additionally, we have derived the phase match condition and have shown that it is always satisfied by one of the object spatial frequencies. At this phase matched spatial frequency the value of the idler transfer function is a maximum and constant, independent of the phase mismatch $\Delta k$, and equal to the amplification which would be obtained if the fields were strictly plane waves without transverse variations. Furthermore we have shown that the transfer function for the idler behaves like a variable spatial filter. That is, by changing the crystal orientation or the input field wave vectors only a segment of the signal spatial frequency spectrum is transferred to the idler. This bandpass behavior is due, in part, to the assumption of a plane wave pump. If the pump also had a transverse structure there would be more phase match possibilities and consequently the idler would be broader and more of the object spectrum passed. Finally, the signal spectrum does not display any of these bandpass features rather its spectrum near the phase match condition is amplified while the remainder is unaltered.

Our numerical example of down conversion in KDP indicates that when the phase match condition $\Delta k = k_p - k_s k_i = 0$ is satisfied, the idler transfer function is centered on zero and has a cutoff frequency of about 500 cm$^{-1}$. This cutoff frequency implies a resolution of 500/2$\pi$lines/cm or about 200 lines/inch which results in an acceptance angle for sharp imaging of about 8 mrad or less. Also, the maximum resolution frequency gives a minimum input aperture of approximately $2\pi/500$ cm. If the crystal is rotated 10 degrees off of the phase match angle so that $\Delta k = 674.53$ the peak moves out of 9011/cm and has a width of approximately 22/cm. From the formula for the cutoff frequency $P_c$ the resolution in the image can be increased either by increasing the gain (i.e., increasing the pump intensity) or by decreasing the crystal length. One must recall, however, that since the peak idler output intensity is proportional to $e^g$, reducing the interaction length may not be very desirable. As $\Delta k$ becomes more and more negative, the spatial bandpass window narrows and shifts to higher and higher spatial frequencies with undiminished gain. Finally, we have derived an imaging equation which describes how a signal object will be imaged at the idler wavelength by the parametraic mixing process. This equation relates the object distance from the crystal entrance face to the image distance from the exit face through the crystal length, indices of refraction, and wavelengths.

In closing it should be mentioned that the results have been obtained with the paraxial apporxiamtion. If the sample is thin, then Helmholtz's equation with its attendent boundary conditions are appropriate. Thus there will be a coupling of the forward and backward waves and consequently many possible phase match conditions.

While the invention has been described in its presently preferred embodiment it is understood that the words which been described are words of description rather than words of limitation and that changes within the purview of the appended claims may be made without departing from the scope and spirit of the invention in its broader aspects.

What is claimed is:

1. An optical parametric amplifier system which illuminates an object of interest using a signal beam and parametrically mixes the signal beam from the object with a pump beam to produce an idler beam which maintains an image of the object of interest, said optical parametric amplifier system comprising:

a signal laser which illuminates said object of interest with said signal beam, said signal beam having a first frequency of value $\omega_s$ wherein said first frequency of said signal laser has a wavelength of about $1.0 \times 10^{-4}$ cm;

a pump laser which produces said pump beam with a second frequency of value $\omega_p$ such that said second frequency of said pump laser has a wavelength of about $353 \times 10^{-7}$ cm and wherein said pump laser produces said pump beam with an adjustable amplitude;

a beam combiner which produces a combined output signal which contains said pump beam and said signal beam by receiving and combining said pump beam from said pump laser with said signal beam reflected from said object of interest; and a nonlinear crystal which receives said combined output signal of said beam combiner, and which produces said idler beam by parametrically mixing the signal beam from said beam combiner which is contained in the combined output signal produced by the beam combiner with the pump beam such that said idler beam has a down conversion frequency $\omega_i$ which has a value which equals the value of the second frequency of said pump beam minus the first frequency of said signal abeam, said idler beam maintaining the image of the object of the object of interest in a transferred scene represented in a down converted frequency, and wherein said nonlinear crystal is a potassium dihydrogen phosphate crystal with a crystal length of about 5 cm and an optical gain of about 1.0/cm, and wherein said idler beam has an idler amplitude that is proportional to said adjustable amplitude of said pump beam so that said idler amplitude may be adjusted by variations in said adjustable amplitude in said pump beam, and wherein said potassium dihydrogen phosphate crystal has a cutoff frequency of about 500 radians/cm which enables said potassium dihydrogen phosphate crystal to act as an amplifying variable spatial bandpass filter as it produces said idler beam which has a tuneable amplitude which is adjusted with a direction of propagation determined by a paraxial phase match which is adjusted by varying an optical axis of the potassium dihydrogen phosphate crystal with the direction of propagation, and said idler beam produced by said potassium dihydrogen phosphate crystal during down conversion has a wavelength of about $545.0 \times 10^{-7}$ cm, said potassium dihydrogen phosphate crystal thereby performing as a parametric down-converter.

* * * * *